United States Patent
Chinnam et al.

(10) Patent No.: US 11,349,723 B1
(45) Date of Patent: May 31, 2022

(54) IDENTIFICATION MAPPING FOR NETWORK DEVICES

(71) Applicant: HEWLETT PACKARD ENTERPRISE DEVELOPMENT LP, Houston, TX (US)

(72) Inventors: Srinivas Chinnam, Bangalore (IN); Ram Sankaran, Bangalore (IN); Thirumala Baladas Kunda, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/161,934

(22) Filed: Jan. 29, 2021

(51) Int. Cl.
| | | |
|---|---|---|
| *G06F 15/173* | (2006.01) | |
| *H04L 41/12* | (2022.01) | |
| *H04L 43/0882* | (2022.01) | |
| *H04L 12/46* | (2006.01) | |
| *H04L 43/0817* | (2022.01) | |

(52) U.S. Cl.
CPC .......... *H04L 41/12* (2013.01); *H04L 12/4666* (2013.01); *H04L 12/4675* (2013.01); *H04L 43/0817* (2013.01); *H04L 43/0882* (2013.01)

(58) Field of Classification Search
None
See application file for complete search history.

(56) References Cited

U.S. PATENT DOCUMENTS

| | | | |
|---|---|---|---|
| 9,369,549 B2 | 6/2016 | Allan | |
| 9,954,694 B2 | 4/2018 | Singh et al. | |
| 10,193,748 B2 | 1/2019 | Kuc et al. | |
| 10,205,638 B1 * | 2/2019 | Angrish | H04L 41/22 |
| 10,354,346 B1 * | 7/2019 | Lok | H04L 63/0892 |
| 2012/0287795 A1 * | 11/2012 | Mohan | H04L 63/00 370/241.1 |
| 2015/0095449 A1 * | 4/2015 | Kuc | H04L 12/4633 709/217 |
| 2015/0271022 A1 * | 9/2015 | Seligson | H04L 12/6418 370/254 |
| 2017/0012827 A1 * | 1/2017 | Ashwood-Smith | H04L 41/12 |
| 2019/0020619 A1 * | 1/2019 | Fitzgerald | H04L 12/4633 |

FOREIGN PATENT DOCUMENTS

IN 3993MU2013 A * 12/2013 ........... H04L 12/721

OTHER PUBLICATIONS

Avaya Inc., "Shortest Path Bridging (802.1 aq) Technical Configuration Guide," Dec. 2015, http://wk.ixueshu.com/file/95f347dbd88525f1.html.

Brocade Communications Systems, Inc., "Leveraging the Benefits of Provider Backbone Bridges," 2010, https://www.tatacommunications.com/vpn/PBBknowledgeCenter/Leveraging_Benefits_PBB_WP-01.pdf.

* cited by examiner

*Primary Examiner* — Phyllis A Book
(74) *Attorney, Agent, or Firm* — Hewlett Packard Enterprise Patent Department (57) ABSTRACT

Examples disclosed herein relate to a method comprising transmitting an ISID VLAN mapping request including a first plurality of ISID VLAN mappings and rejecting a first ISID VLAN mapping belonging to the plurality. The method comprises performing a recovery event, transmitting a mapping request message to the AAC in response to the recovery event and transmitting a second plurality of ISID VLAN mappings including the first ISID VLAN mapping. The method comprises validating first ISID VLAN mapping; and establishing network traffic between the AAS and the AAC for the first ISID VLAN mapping.

20 Claims, 5 Drawing Sheets

IDENTIFICATION MAPPING FOR NETWORK DEVICES

BACKGROUND

Shortest Path Bridging (SPB) is a technology to enable communication and configuration of devices on a network, while enabling multipath routing.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Auto Attach is a technology used to allow a non-SPB device to connect to an SPB capable networking device. The non-SPB device may be called an AA client (AAC) and the SPB capable networking device may be called the AA server (AAS).

An AA Client may be, for example, a non-SPB device that supports some form of Service Identifier/Virtual Local Area Network (I-SID/VLAN) binding definition and, if connectivity permits, may have the ability to advertise this data to a directly connected AA Server.

An AA Server may be, for example, a SPB device that potentially accepts externally generated I-SID/VLAN assignments that can be used for automated configuration purposes. Each I-SID/VLAN assignment in an AA request may be received by the AAS may be processed individually and may be accepted or rejected.

The AAC may send the ISID-VLAN mapping requests to the AAS and the AAS accepts the mapping and replies back to the AAC. The AAC then sends the ISID-VLAN mappings to the AAS. AAS may reject some/all the mappings based on the internal reasons. The same is replied back from the AAS to the AAC.

As described above, the AAS may reject a VLAN-ISID mappings received from AAC for a variety of reasons. Some of the reasons may be temporary. Temporary reasons for rejection may include, for example, an I-SID service may not be enabled, other resources like VLAN may not available or may be in an unknown, there may be a configuration error, a duplication error, etc. Rejected mappings may be passed back to the originating AAC with a rejected state and, if appropriate, an indication as to why the rejection occurred.

Based on the AAC implementation, after receiving the LLDP TLV containing the rejections, the AAC may do a number of things. In one aspect, the AAC may continue to send the complete ISID-VLAN mapping list including the rejected ISID-VLAN mapping at some regular LLDP interval to the AAS. Based on the LLDP interval configured, there could be a delay between the recovery event that happens at the AAS and the next LLDP interval event triggered at the AAC which sends the ISID-VLAN mappings again.

In another aspect, the AAC may only send the accepted ISID-VLAN service mapping to the AAS. If there is a recovery event at the AAS, there is no intimation made to the AAC informing of this event. AAC continues to send only the accepted ISID-VLAN mappings. Thus the network reconvergence does not happen for the rejected ISID-VLAN mapping despite the recovery event at the AAS. Network traffic does not converge for the rejected mappings.

In either aspect, if the temporary issue that prevented the mappings from being received is resolved by AA Server, there may be no way to communicate to AAC to resend the mappings immediately. For example, in the first aspect, the AAC may take up to maximum of LLDP transmit interval time (typically 60 seconds or more) to resend the VLAN-ISID mapping to the AAS. In the second aspect, the AAC may not resend the rejected VLAN-ISID mapping at all and the service will not reconverge.

The method and systems described herein may provide a solution for the above problem. Specifically, when the AAS has an AAC client attached and a change is triggered in AAS that resolves the temporary error preventing the mappings from being accepted, the AAS may sends an LLDP request to AAC for resending the VLAN-ISID mappings. The AAC may then resend the complete ISID-VLAN mapping to the AAS. The AAS may then validate the ISID-VLAN mappings as per the standard IEEE P802.1Qcj/D0.1.

In at least one embodiment, the subject matter claimed below includes a method. The method may comprise transmitting, from an auto attach client (AAC) to an auto attach server (AAS) an ISID VLAN mapping request including a first plurality of ISID VLAN mappings and rejecting, by the AAS, a first ISID VLAN mapping belonging to the plurality. The method may also comprise performing, by the AAS, a recovery event and transmitting, by the AAS, a mapping request message to the AAC in response to the recovery event. The method may also comprise transmitting, by the AAC, a second plurality of ISID VLAN mappings including the first ISID VLAN mapping and validating, by the AAS, the first ISID VLAN mapping. The method may also comprise establishing, by the AAS, network traffic between the AAS and the AAC for the first ISID VLAN mapping.

Figure 1:
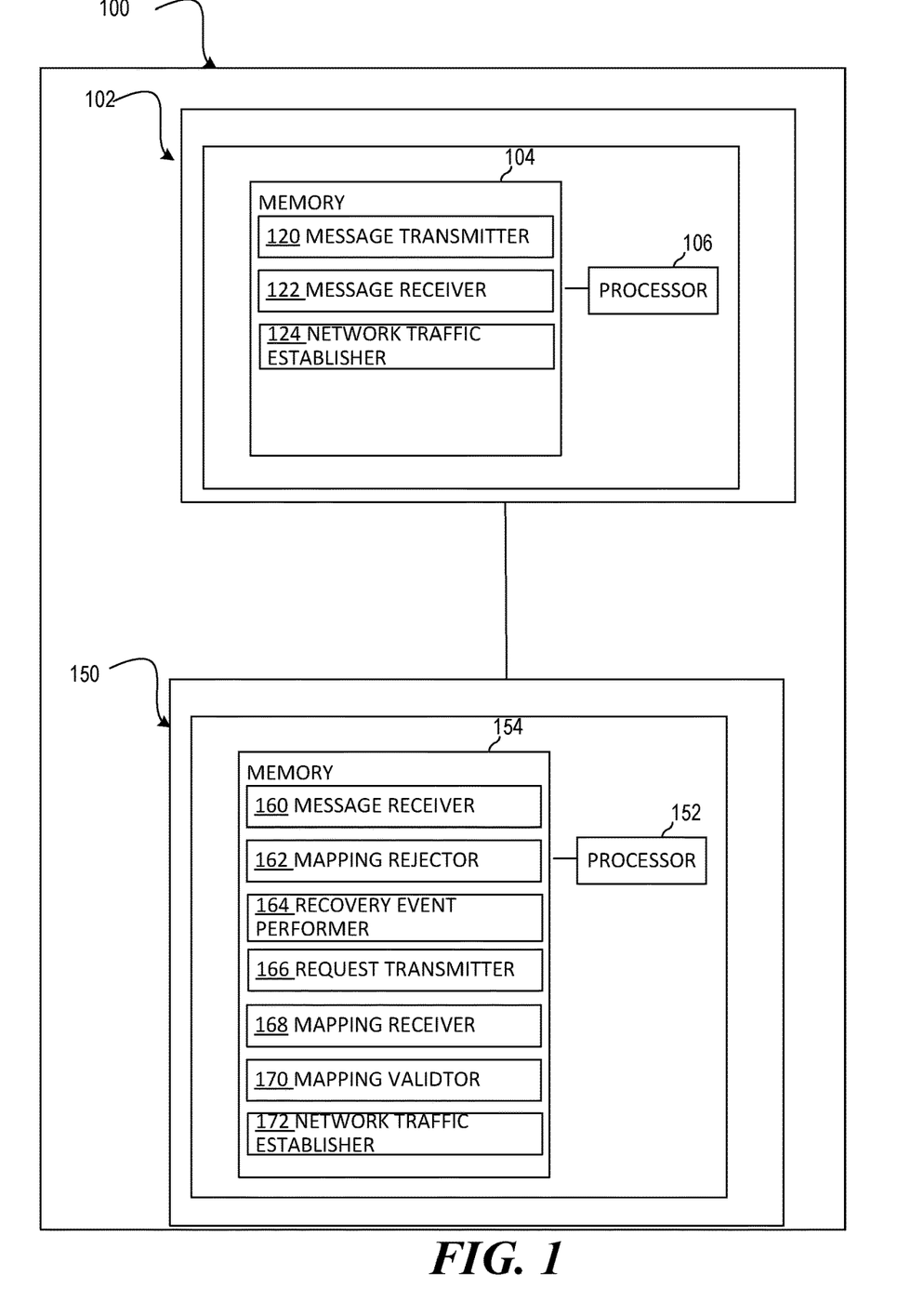
FIG. 1 is a block diagram of an example environment in which identification mapping for network devices may be useful.

FIG. 1 is a block diagram of an example system for identification mapping for network devices. A networking system 100, may include a plurality of network devices including an AAC 102 and an AAS 150. The plurality of network devices 102 150 may be connected via a communication link. The communication link may be a physical link, such as Ethernet, a wireless link, etc.

AAC 102 and AAS 150 may support Shortest Path Bridging (SPB) and/or Auto Attach technology. SPB is a technology to enable communication and configuration of devices on a network, while enabling multipath routing. Auto Attach is a technology used to allow a non-SPB device to connect to an SPB capable networking device. The non-SPB device may be called an AA client (AAC) and the SPB capable networking device may be called the AA server (AAS).

The AAC 102 may be, for example, a non-SPB device that supports some form of Service Identifier/Virtual Local Area Network (I-SID/VLAN) binding definition and, if connectivity permits, may have the ability to advertise this data to a directly connected AA Server.

The AAC may, for example, be a network switch with routing capabilities such that the network device is responsible for routing data along a route (or equivalently, path) in the network. The network device may perform, for example, routing of data based on routing information accessible by the router. For example, the routing information can be stored on a storage medium of the network device, or on a storage medium separate from but accessible by the network device.

The AAC may, for example, be a wired network device such as a switch, router, WLAN controller, etc.).

An AAS 150 may be, for example, a SPB device that potentially accepts externally generated I-SID/VLAN assignments that can be used for automated configuration purposes. Each I-SID/VLAN assignment in an AA request may be received by the AAS may be processed individually and may be accepted or rejected.

The AAS may, for example, be a network switch with routing capabilities such that the network device is responsible for routing data along a route (or equivalently, path) in the network. The network device may perform, for example, routing of data based on routing information accessible by the router. For example, the routing information can be stored on a storage medium of the network device, or on a storage medium separate from but accessible by the network device.

The AAS may, for example, be a wired network device such as a switch, router, WLAN controller, etc.).

As described above, configuring a connection between the AAS and the AAC may be difficult when there is an error with the AAS during configuration. Errors during configuration may lead to a situation where each of the ISID-VLAN service mappings transmitted from the AAC to the AAS are not accepted by the AAS.

System 100 may be used to resolve this and other problems. A block diagram of an example AAC may include a memory 104 and a processor 106 that may be coupled to each other through a communication link (e.g., a bus). Processor 106 may include a single or multiple Central Processing Units (CPU), microprocessor, Application Specific Integrated Circuit (ASIC) and/or other hardware devices suitable for retrieval and execution of instructions stored in machine-readable storage medium. In some examples, memory 104 stores machine readable instructions executed by processor 106 for AAC 102. Memory 104 may include any suitable combination of volatile and/or non-volatile memory, such as combinations of Random Access Memory (RAM), Read-Only Memory (ROM), flash memory, and/or other suitable memory.

Memory 104 stores instructions to be executed by processor 106 including instructions for message transmitter 120, message receiver 122, network traffic establisher 124, and/or other components. According to various implementations, AAC 102 may be implemented in hardware and/or a combination of hardware and programming that configures hardware. Furthermore, in FIG. 1 and other Figures described herein, different numbers of components or entities than depicted may be used.

A block diagram of an example AAS may include a processor 152 and a memory 154 that may be coupled to each other through a communication link (e.g., a bus). Processor 152 may include a single or multiple Central Processing Units (CPU), microprocessor, Application Specific Integrated Circuit (ASIC) and/or other hardware devices suitable for retrieval and execution of instructions stored in machine-readable storage medium. In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for message receiver 160, mapping rejector 162, mapping event performer 164, request transmitter 166, mapping receiver 168, mapping validator 170, network traffic establisher 172 and/or other components. According to various implementations, AAS 150 may be implemented in hardware and/or a combination of hardware and programming that configures hardware. Furthermore, in FIG. 1 and other Figures described herein, different numbers of components or entities than depicted may be used.

Processor 106 of AAC 102 may execute message transmitter 120 to transmit a discovery message to AAS 150. The discovery message may include information about the AAC 102 as well as a request to establish a connection via auto attach. In response, processor 152 of AAS 150 may execute message receiver 160 to transmit a discovery acknowledgement in response. In some aspects, the AAS 150 may initiate the discovery message and the AAC 102 may respond.

Processor 106 of AAC 102 may execute message transmitter 120 to transmit from the AAC 102 to the AAS 150 an ISID VLAN mapping request including a first plurality of ISID VLAN mappings.

Processor 152 of AAS 150 may execute message receiver 160 to receive, from the AAC 102, an ISID VLAN mapping request including a first plurality of ISID VLAN mappings and process the mapping request. During the processing of the mapping request, an error may occur within the AAS 150. These errors may include, for example, an I-SID service may not be enabled, other resources like VLAN may not available or may be in an unknown, there may be a configuration error, a duplication error, a resource error, configuration issue, etc.

Processor 152 of AAS 150 may execute mapping rejector 162 to reject a first ISID VLAN mapping belonging to the plurality. In some aspects, more ISID VLAN mappings may be rejected as well. Rejected mappings may be passed back to the originating AAC 102 with a rejected state and, if appropriate, an indication as to why the rejection occurred. Due to the rejection of the ISID VLAN mapping(s), networking traffic may not be established for the rejected ISID VLAN mapping(s).

Processor 106 of AAC 102 may execute message receiver 122 to receive, from the AAS 150, a rejection that a first ISID VLAN mapping belonging to the plurality. Due to the rejection of the ISID VLAN mapping(s), networking traffic may not be established for the rejected ISID VLAN mapping(s).

However, the error in the AAS 150 may be temporary and eventually fixed via a recovery event. Processor 152 of AAS 150 may execute recovery event performer 164 to perform a recovery event. The recovery event may be, for example, an automatic fix (such as a resource becoming available), a manual fix (by a system administrator or other user) or via some other type of recover. After the recovery event is performed, Processor 152 of AAS 150 may execute request transmitter 166 to transmit a mapping request message to the AAC in response to the recovery event. The mapping request message may be Link Layer Discovery Protocol (LLDP) synchronization message. The message may include a type length value (TLV) with a flag indicating a request for an ISID VLAN mapping. The TLV may have the same type as other messages sent and the flag may, for example, be a new 802.1 Subtype in the TLV with a value of 13.

Processor 106 of AAC 102 may execute message receiver 122 to receive, from the AAS 150, a mapping request message to the AAC 102 in response to a recovery event at the AAS 150. Processor 106 of AAC 102 may execute message transmitter 120 to transmit a second plurality of ISID VLAN mappings including the first ISID VLAN mapping.

Processor 152 of AAS 150 may execute mapping receiver 168 to receive a second plurality of ISID VLAN mappings including the first ISID VLAN mapping. Processor 152 of AAS 150 may execute mapping validator 170 to validate the first ISID VLAN mapping and may execute networking traffic establisher 172 to establish network traffic between the AAS 150 and the AAC 102 for the first ISID VLAN mapping. Processor 152 of AAS 150 may execute a message transmitter to transmit a message to the AAC 102 accepting the first ISID VLAN mapping.

Processor 106 of AAC 102 may execute network traffic establisher 124 to establish network traffic between the AAS and the AAC for the first ISID VLAN mapping. It should be noted that system 100 describes one ISID VLAN mapping for simplicity and that more than one ISID VLAN mapping can be processed by system 100.

Figure 2:
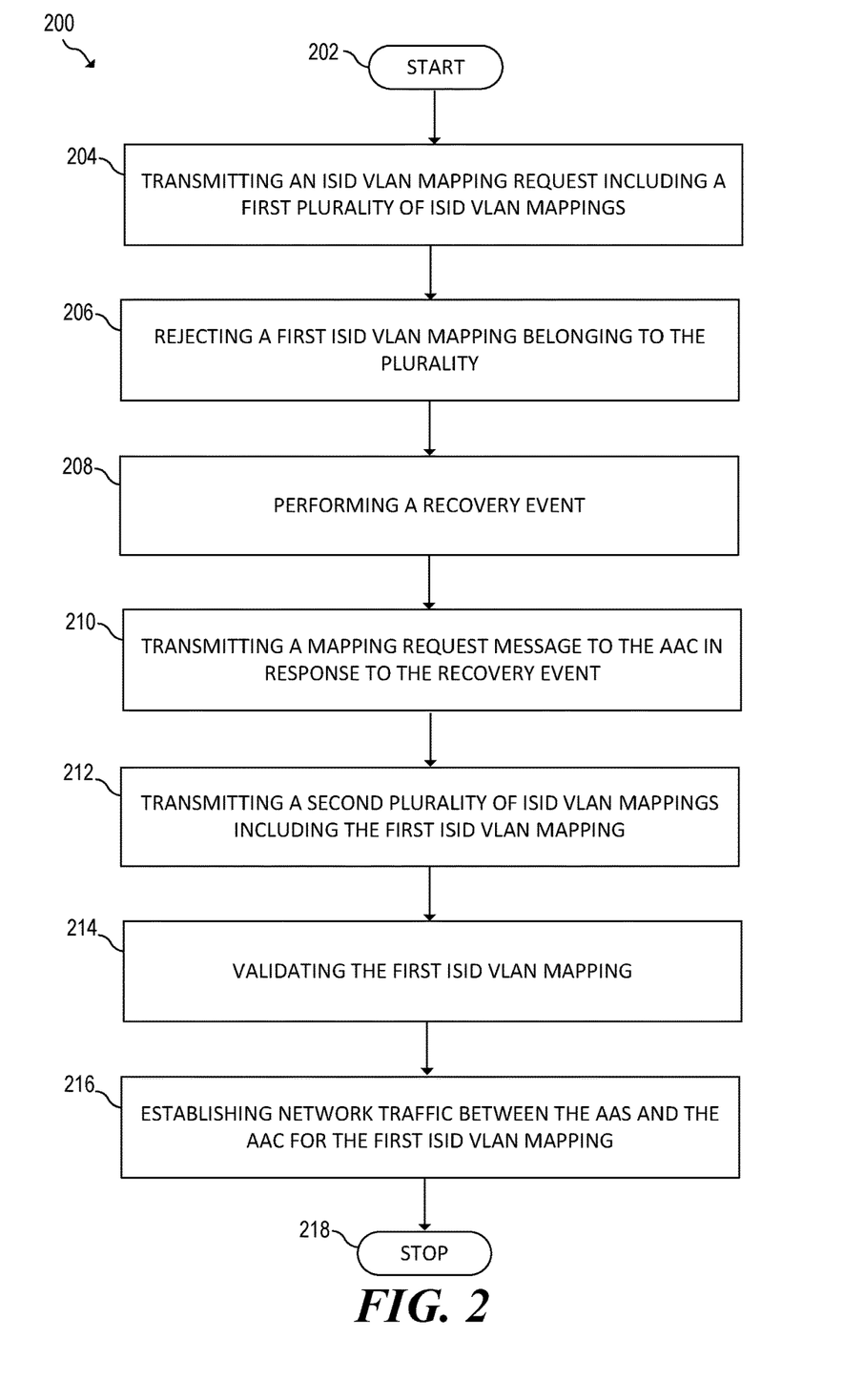
FIG. 2 is a flow diagram of an example method for identification mapping for network devices.

FIG. 2 is a flow diagram of a method 200 for identification mapping for network devices. The system where method 200 is performed may be similar to system 100 described above. Accordingly, parts of and/or the entire method may be performed by one or more of the devices belonging to system 100. For example, method 200 may be performed by AAC 102 and AAS 150.

The method 200 may begin at block 202 and proceed to block 204, where the method may include transmitting, from an auto attach client (AAC) to an auto attach server (AAS) an ISID VLAN mapping request including a first plurality of ISID VLAN mappings. In some aspects, the method may include rejecting each ISID VLAN mapping in the first plurality of ISID VLAN mappings. In some aspects the rejection may be due to an issue with the AAS and in some aspects, the issue with the AAS is temporary. The rejection may initially prevent network traffic from being established for the first mapping. At block 206, the method may include rejecting, by the AAS, a first ISID VLAN mapping belonging to the plurality and at block 208, the method may include performing, by the AAS, a recovery event.

At block 210, the method may include transmitting, by the AAS, a mapping request message to the AAC in response to the recovery event. The mapping request message may be a Link Layer Discovery Protocol (LLDP) synchronization message. The mapping request message may include a type length value (TLV) with a flag indicating a request for an ISID VLAN mapping. At block 212, the method may include transmitting, by the AAC, a second plurality of ISID VLAN mappings including the first ISID VLAN mapping. At block 214, the method may include validating, by the AAS, the first ISID VLAN mapping and at block 216, the method may include establishing, by the AAS, network traffic between the AAS and the AAC for the first ISID VLAN mapping. The method may proceed to block 218, where the method may end.

Figure 3:
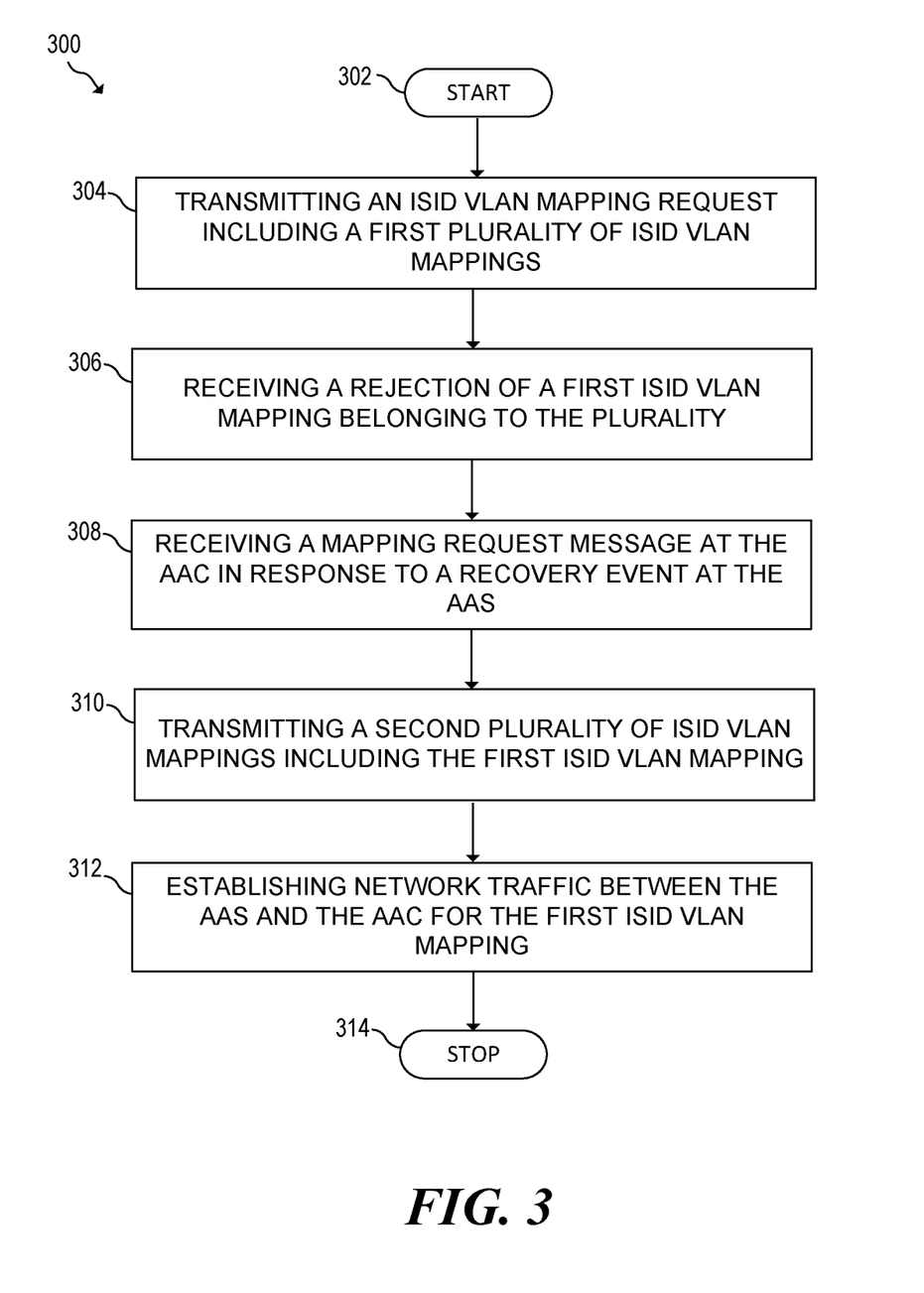
FIG. 3 is a flow diagram of another example method for identification mapping for network devices.

FIG. 3 is a flow diagram of a method 300 for identification mapping for network devices. The system where method 300 is performed may be similar to system 100 described above. Accordingly, parts of and/or the entire method may be performed by one or more of the devices belonging to system 100. For example, method 300 may be performed by AAC 102.

The method 300 may begin at block 302 and proceed to block 304, where the method may include transmitting an ISID VLAN mapping request including a first plurality of ISID VLAN mappings. At block 306, the method may include receiving a rejection of a first ISID VLAN mapping. In some aspects, the method may include a rejection of each ISID VLAN mapping in the first plurality of ISID VLAN mappings. In some aspects the rejection may be due to an issue with the AAS and in some aspects, the issue with the AAS is temporary. The rejection may initially prevent network traffic from being established for the first mapping. At block 308, the method may include receiving a mapping request message at the AAC in response to a recovery event at the AAS. The mapping request message may be a Link Layer Discovery Protocol (LLDP) synchronization message. The mapping request message may include a type length value (TLV) with a flag indicating a request for an ISID VLAN mapping.

At block 310, the method may include transmitting a second plurality of ISID VLAN mappings including the first ISID VLAN mapping. At block 312, the method may include establishing network traffic between the AAS and the AAC for the first ISID VLAN mapping. The method may proceed to block 314, where the method may end.

Figure 4:
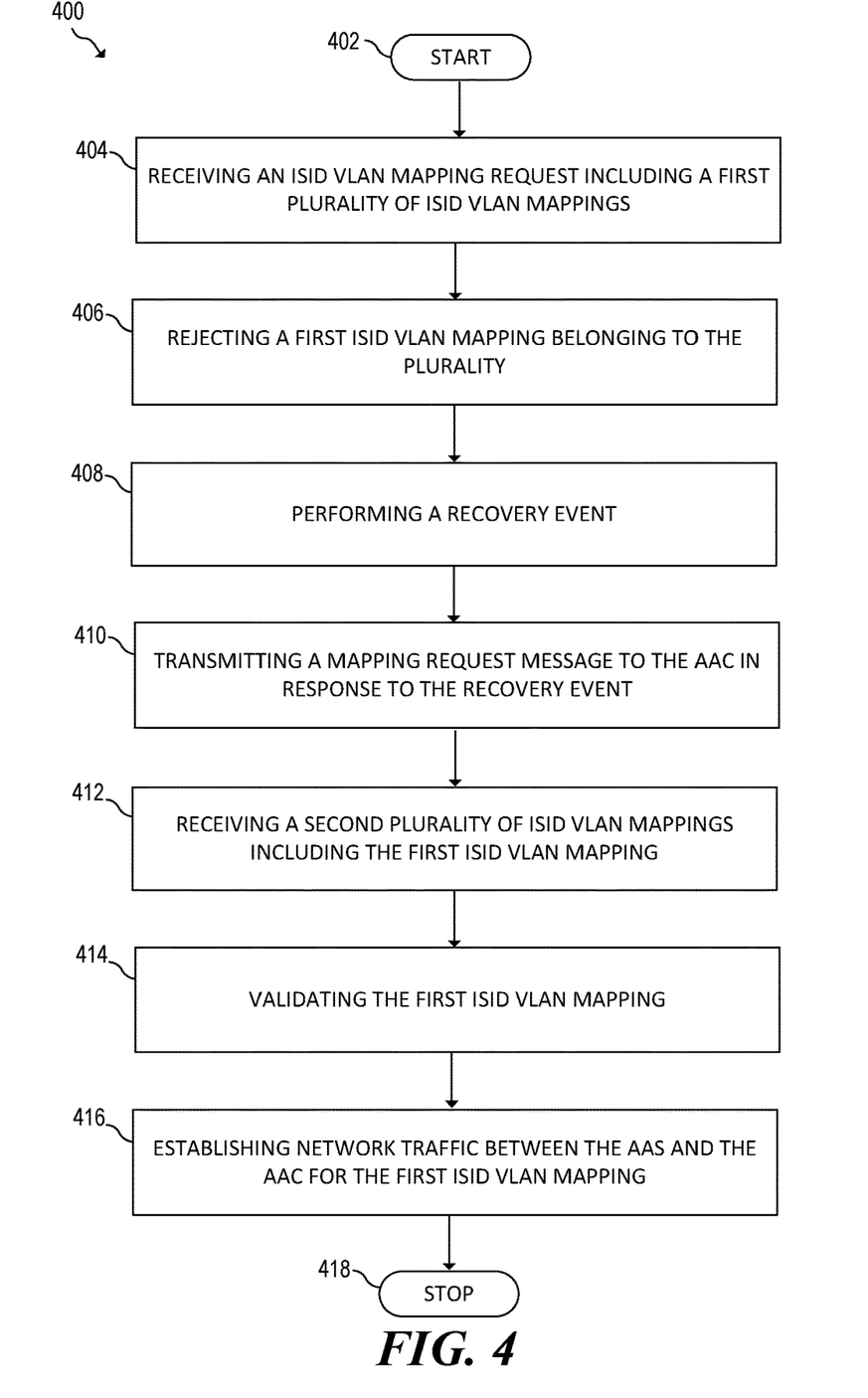
FIG. 4 is a flow diagram of another example method for identification mapping for network devices.

FIG. 4 is a flow diagram of a method 400 for identification mapping for network devices. The system where method 400 is performed may be similar to system 100 described above. Accordingly, parts of and/or the entire method may be performed by one or more of the devices belonging to system 100. For example, method 400 may be performed by AAS 150.

Method 400 may start at block 402 and continue to block 404, where the method 400 may include receiving an ISID VLAN mapping request include a first plurality of ISID VLAN mappings. At block 406, the method may include rejecting a first ISID VLAN mapping belonging to the plurality. At block 408, the method may include performing a recovery event and at block 410 the method may include transmitting a mapping request message to the AAC in response to the recovery event. At block 412, the method may include receiving a second plurality of ISID VLAN mappings including the first ISID VLAN mapping. At block 414, the method may include validating the first ISID VLAN mapping and at block 416, the method may include establishing network traffic between the AAS and the AAC for the first ISID VLAN mapping. The method may proceed to block 418, where the method may end.

Figure 5:
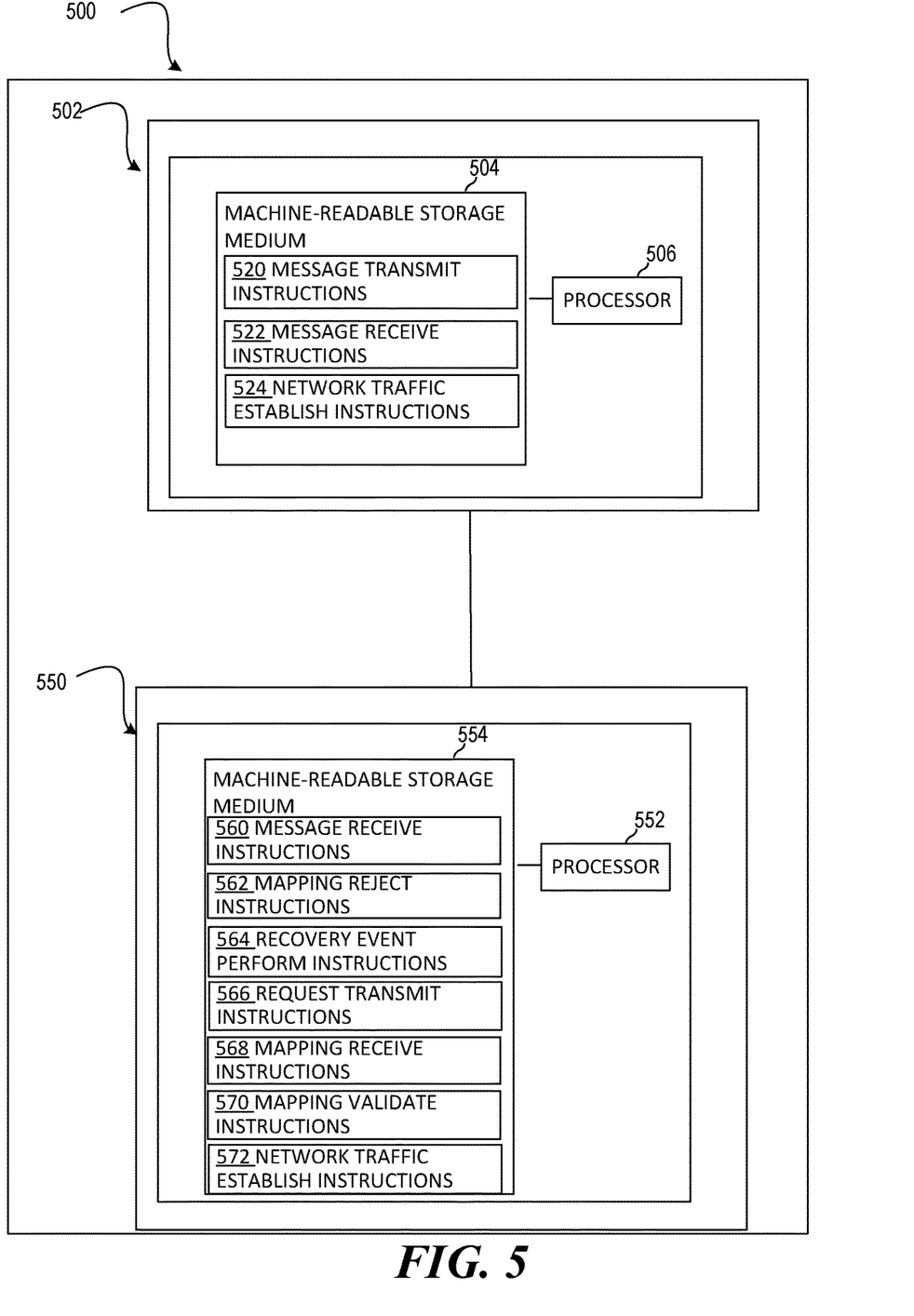
FIG. 5 is a block diagram of an example storage medium storing machine-readable instructions for identification mapping for network devices.

FIG. 5 is a block diagram of an example system 500 for identification mapping for network devices. In the example illustrated in FIG. 5, system 500 includes an AAC 502 with a processor 506 and a machine-readable storage medium 504 and an AAS 550 with a processor 552 and a machine-readable storage medium 554. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 506 may be at least one central processing unit (CPU), microprocessor, Application Specific Integrated Circuit (ASIC) and/or other hardware devices suitable for retrieval and execution of instructions stored in machine-readable storage medium 504. In the example illustrated in FIG. 5, processor 506 may fetch, decode, and execute instructions 520, 522 and 524. Processor 506 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, message transmit instructions 520, when executed by a processor (e.g., 506), may cause system 500 to transmit a discovery message to AAS 550. The discovery message may include information about the AAC 502 as well as a request to establish a connection via auto attach.

Message receive instructions 522, when executed by a processor (e.g., 506), may cause system 500 to receive, from the AAC 502, an ISID VLAN mapping request including a first plurality of ISID VLAN mappings and process the mapping request. During the processing of the mapping request, an error may occur within the AAS 550. These errors may include, for example, an I-SID service may not be enabled, other resources like VLAN may not available or may be in an unknown, there may be a configuration error, a duplication error, a resource error, configuration issue, etc.

Message receive instructions 522 may also be executed by a processor (e.g., 506) to cause the system to receive, from the AAS 550, a rejection that a first ISID VLAN mapping belonging to the plurality. Due to the rejection of the ISID VLAN mapping(s), networking traffic may not be established for the rejected ISID VLAN mapping(s). In some aspects, the method may include rejecting each ISID VLAN mapping in the first plurality of ISID VLAN mappings. In some aspects the rejection may be due to an issue with the AAS 550 and in some aspects, the issue with the AAS 550 is temporary. The rejection may initially prevent network traffic from being established for the first mapping.

Message receiver instructions 522 may also be executed by a processor (e.g., 506) to receive, from the AAS 550, a mapping request message to the AAC 502 in response to a recovery event at the AAS 550. The mapping request message may be a Link Layer Discovery Protocol (LLDP) synchronization message. The mapping request message may include a type length value (TLV) with a flag indicating a request for an ISID VLAN mapping.

Network establish instructions 524, when executed by a processor (e.g., 506), may cause system 500 to establish network traffic between the AAS 550 and the AAC 502 for the first ISID VLAN mapping. It should be noted that system 500 describes one ISID VLAN mapping for simplicity and that more than one ISID VLAN mapping can be processed by system 500.

System 500 may also includes a AAS 550 with a processor 552 and a machine-readable storage medium 554. Processor 552 may be at least one central processing unit (CPU), microprocessor, Application Specific Integrated Circuit (ASIC) and/or other hardware devices suitable for retrieval and execution of instructions stored in machine-readable storage medium 554. In the example illustrated in FIG. 5, processor 552 may fetch, decode, and execute instructions 560, 562, 564, 566, 568, 570 and 572. Processor 552 may include at least one electronic circuit comprising a number of electronic components for performing the functionality of at least one of the instructions in machine-readable storage medium 554. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 554 may be any electronic, magnetic, optical, or other physical storage device that stores executable instructions. Thus, machine-readable storage medium 554 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 554 may be encoded with executable instructions for context aware data backup. The machine-readable storage medium may be non-transitory.

Referring to FIG. 5, message receive instructions 560, when executed by a processor (e.g., 552), may cause system 500 to receive, from the AAC 502, an ISID VLAN mapping request including a first plurality of ISID VLAN mappings and process the mapping request. During the processing of the mapping request, an error may occur within the AAS 550. These errors may include, for example, an I-SID service may not be enabled, other resources like VLAN may not available or may be in an unknown, there may be a configuration error, a duplication error, a resource error, configuration issue, etc.

Mapping reject instructions 562, when executed by a processor (e.g., 552), may cause system 500 to reject a first ISID VLAN mapping belonging to the plurality. In some aspects, more ISID VLAN mappings may be rejected as well. Rejected mappings may be passed back to the originating AAC 502 with a rejected state and, if appropriate, an indication as to why the rejection occurred. Due to the rejection of the ISID VLAN mapping(s), networking traffic may not be established for the rejected ISID VLAN mapping(s).

In some aspects, the method may include rejecting each ISID VLAN mapping in the first plurality of ISID VLAN mappings. In some aspects the rejection may be due to an issue with the AAS 550 and in some aspects, the issue with the AAS 550 is temporary. The rejection may initially prevent network traffic from being established for the first mapping.

Recovery event perform instructions 564, when executed by a processor (e.g., 552), may cause system 500 to perform a recovery event. The recovery event may be, for example, an automatic fix (such as a resource becoming available), a manual fix (by a system administrator or other user) or via some other type of recover. Request transmit instructions 566, when executed by a processor (e.g., 552), may cause system 500 to transmit a mapping request message to the AAC 502 in response to the recovery event The mapping request message may be a Link Layer Discovery Protocol (LLDP) synchronization message. The mapping request message may include a type length value (TLV) with a flag indicating a request for an ISID VLAN mapping. Mapping receive instructions 568, when executed by a processor (e.g., 552), may cause system 500 to receive a second plurality of ISID VLAN mappings including the first ISID VLAN mapping. Mapping validate instructions 570, when executed by a processor (e.g., 552), may cause system 500 to validate the first ISID VLAN mapping. Network traffic establish instructions 572, when executed by a processor (e.g., 552), may cause system 500 to establish network traffic between the AAS 550 and the AAC 502 for the first ISID VLAN mapping The foregoing disclosure describes a number of examples for identification mapping for network devices. The disclosed examples may include systems, devices, computer-readable storage media, and methods for identification mapping for network devices. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method, comprising:
receiving, from an auto attach client (AAC) at an auto attach server (AAS), a first mapping request message comprising a first plurality of instance service identifier (ISID) to a virtual local area network (VLAN) mappings;
rejecting, by the AAS, a first ISID to VLAN mapping belonging to the first plurality of ISID to VLAN mappings due to an issue that prevents network traffic from being established for the first mapping, wherein the issue is associated with at least one of: a disabled ISID service, an unavailable or unknown VLAN, a configuration error, a duplication error, and a resource error;
performing, by the AAS, a recovery event for mitigating the issue;
sending, by the AAS, a second mapping request message to the AAC in response to the recovery event;
receiving, from the AAC at the AAS, a second plurality of ISID to VLAN mappings comprising the first ISID to VLAN mapping;
validating, by the AAS, the first ISID to VLAN mapping; and
in response to the validation, establishing, by the AAS, network traffic between the AAS and the AAC for the first ISID to VLAN mapping.

2. The method of claim 1, comprising:
rejecting a respective ISID to VLAN mapping in the first plurality of ISID to VLAN mappings.

3. The method of claim 1, wherein the issue is associated with unavailability of a corresponding resource at the AAS.

4. The method of claim 1, wherein the issue is a temporary error preventing the first ISID to VLAN mapping from being accepted at the AAS.

5. The method of claim 1, wherein the second mapping request message is a Link Layer Discovery Protocol (LLDP) synchronization message.

6. The method of claim 1, where the second mapping request message includes a type length value (TLV) with a flag indicating a request for an ISID to VLAN mapping.

7. The method of claim 1, wherein the recovery event includes automatic mitigation of the issue at the AAS.

8. A system, comprising:
a message logic block to receive, from an auto attach client (AAC) at an auto attach server (AAS), a first mapping request message comprising a first plurality of instance service identifier (ISID) to a virtual local area network (VLAN) mappings;
a rejection logic block to reject a first ISID to VLAN mapping belonging to the first plurality of ISID to VLAN mappings due to an issue that prevents network traffic from being established for the first mapping, wherein the issue is associated with at least one of: a disabled ISID service, an unavailable or unknown VLAN, a configuration error, a duplication error, and a resource error;
a recovery logic block to perform a recovery event for mitigating the issue;
a mapping request logic block to send a second mapping request message to the AAC in response to the recovery event at the AAS;
wherein the message logic block is further to receive a second plurality of ISID to VLAN mappings comprising the first ISID to VLAN mapping;
a validation logic block to validate the first ISID to VLAN mapping at the AAS; and
a network traffic establisher to, in response to the validation, establish network traffic between the AAS and the AAC for the first ISID to VLAN mapping.

9. The system of claim 8, wherein a respective ISID to VLAN mapping in the first plurality of ISID to VLAN mappings is rejected by the AAS.

10. The system of claim 8, wherein the issue is associated with unavailability of a corresponding resource at the AAS.

11. The system of claim 8, wherein the issue is a temporary error preventing the first ISID to VLAN mapping from being accepted at the AAS.

12. The system of claim 8, wherein the second mapping request message is a Link Layer Discovery Protocol (LLDP) synchronization message.

13. The system of claim 8, where the second mapping request message includes a type length value (TLV) with a flag indicating a request for an ISID to VLAN mapping.

14. The system of claim 8, wherein the recovery event includes automatic mitigation of the issue at the AAS.

15. A non-transitory machine-readable storage medium encoded with instructions, the instructions executable by a processor of a system to cause the system to:
receive, from an auto attach client (AAC) at an auto attach server (AAS), a first mapping request message comprising a first plurality of instance service identifier (ISID) to a virtual local area network (VLAN) mappings;
reject a first ISID to VLAN mapping belonging to the first plurality of ISID to VLAN mappings due to an issue that prevents network traffic from being established for the first mapping, wherein the issue is associated with at least one of: a disabled ISID service, an unavailable or unknown VLAN, a configuration error, a duplication error, and a resource error;
perform a recovery event for mitigating the issue;
send a second mapping request message to the AAC in response to the recovery event;
receive, from the AAC, a second plurality of ISID to VLAN mappings comprising the first ISID to VLAN mapping;
validate the first ISID to VLAN mapping; and
in response to the validation, establish network traffic between the AAS and the AAC for the first ISID to VLAN mapping.

16. The non-transitory machine-readable storage medium of claim 15, the instructions executable by a processor of a system to cause the system to:
reject a respective ISID to VLAN mapping in the first plurality of ISID to VLAN mappings.

17. The non-transitory machine-readable storage medium of claim 15, wherein the issue is associated with unavailability of a corresponding resource at the AAS.

18. The non-transitory machine-readable storage medium of claim 15, wherein the second mapping request message is a Link Layer Discovery Protocol (LLDP) synchronization message.

19. The non-transitory machine-readable storage medium of claim 15, wherein the second mapping request message includes a type length value (TLV) with a flag indicating a request for an ISID to VLAN mapping.

20. The non-transitory machine-readable storage medium of claim 15, wherein the recovery event includes automatic mitigation of the issue at the AAS.

\* \* \* \* \*